(12) United States Patent
Trnovec

(10) Patent No.: US 11,161,534 B1
(45) Date of Patent: Nov. 2, 2021

(54) PORTABLE COOLER

(71) Applicant: Julius Trnovec, Freeport, NY (US)

(72) Inventor: Julius Trnovec, Freeport, NY (US)

( * ) Notice: Subject to any disclaimer, the term of this patent is extended or adjusted under 35 U.S.C. 154(b) by 0 days.

(21) Appl. No.: 17/376,574

(22) Filed: Jul. 15, 2021

(51) Int. Cl.
*B62B 1/16* (2006.01)
*B65D 25/20* (2006.01)
*B65D 81/18* (2006.01)
*B65D 25/32* (2006.01)

(52) U.S. Cl.
CPC ............... *B62B 1/16* (2013.01); *B65D 25/20* (2013.01); *B65D 25/32* (2013.01); *B65D 81/18* (2013.01)

(58) Field of Classification Search
CPC ........ B62B 1/16; B62B 1/26; B62B 2203/04; B65D 25/108; B65D 25/10; A45C 5/14
See application file for complete search history.

(56) References Cited

U.S. PATENT DOCUMENTS

| 5,287,969 A | * | 2/1994 | Kehr | ...................... B65D 81/02 |
| | | | | 119/52.2 |
| 8,196,951 B2 | * | 6/2012 | Blakeman | ................ A45C 5/14 |
| | | | | 280/655 |
| 2017/0158216 A1 | * | 6/2017 | Yahav | ....................... B62B 1/16 |

* cited by examiner

*Primary Examiner* — Andrew T Kirsch
(74) *Attorney, Agent, or Firm* — Sean R. Wilsusen, Esq.; Carter, DeLuca & Farrell LLP

(57) ABSTRACT

A portable cooler includes a first semicylindrical member defining a first aperture in a first side and a second aperture in a second side thereof. A second semicylindrical member is hingedly coupled with the first semicylindrical member. A cradle is removably positioned in the first semicylindrical member. The cradle can rotate with respect to the first semicylindrical member within the space defined by the first semicylindrical member. First and second wheels are rotatably coupled with the first semicylindrical member. First and second axles extend through the wheels and first semicylindrical member and into the cradle. The axles allow independent rotation of the cradle, the first semicylindrical member and the wheels to maintain a substantially horizontal rotational orientation of the cradle with respect to the first semicylindrical member.

18 Claims, 4 Drawing Sheets

PORTABLE COOLER

FIELD

The present disclosure relates to a cooler, and more particularly, to a portable cooler.

BACKGROUND

Generally, moving supplies such as coolers to recreational areas such as beaches can be challenging. In particular, when transitioning from hard or paved surfaces to soft surfaces such as sand it can be difficult to transport supplies. Therefore, it is desirable to have a cooler that is portable and practically movable across both hard/paved surfaces and soft surfaces such as sand.

SUMMARY

Provided in accordance with aspects of the present disclosure is a portable cooler includes a first semicylindrical member defining a first side and a second side. The first semicylindrical member defines a first aperture in the first side and a second aperture in the second side. The first semicylindrical member defines a space. A second semicylindrical member is hingedly coupled with the first semicylindrical member. The first semicylindrical member and the second semicylindrical member define a cylindrical member when in a closed configuration. A cradle is removably positioned in the first semicylindrical member. The cradle defines a first side and a second side. The cradle defines a first orifice in the first side and a second orifice in the second side of the cradle. The cradle can rotate with respect to the first semicylindrical member within the space defined by the first semicylindrical member. A first wheel is rotatably coupled with the first semicylindrical member at the first side of the first semicylindrical member. The first wheel includes a first hub and a first aperture defined in the first hub. A second wheel is rotatably coupled with the first semicylindrical member at the second side of the first semicylindrical member. The second wheel includes a second hub and a second aperture defined in the second hub. A handle is coupled with the first wheel and the second wheel. A first axle extends through the first aperture of the first hub. The first axle also extends through the first aperture in the first side of the first semicylindrical member and into the first orifice in the first side of the cradle. A second axle extends through the second aperture of the second hub. The second axle also extends through the second aperture in the second side of the first semicylindrical member and into the second orifice in the second side of the cradle.

In an aspect of the present disclosure, the cylindrical member can rotate about the first axle and the second axle independently of the first wheel and the second wheel. The cylindrical member can rotate independently of the cradle. The first wheel can rotate about the first axle independently of the handle, and the second wheel can rotate about the second axle independently of the handle.

In an aspect of the present disclosure, a threaded bore is formed in each of the first aperture in the first side of the first semicylindrical member and the second aperture in the second side of the first semicylindrical member. A threaded member is defined along each of the first axle and the second axle. A first unthreaded member is defined along each of the first axle and the second axle. A second unthreaded member is defined along each of the first axle and the second axle. The threaded member of the first axle or the second axle is threaded into the threaded bore to connect the first axle or the second axle with the first semicylindrical member. The first unthreaded member is position in the first aperture of the first hub or the second aperture of the second hub. The first unthreaded member allows rotation of the first wheel or the second wheel with respect to the first semicylindrical member. The second unthreaded member is positioned in the first orifice or the second orifice of the cradle. The second unthreaded member allows rotation of the cradle with respect to the first semicylindrical member.

In an aspect of the present disclosure, the first axle and the second axle are removably coupled with the first semicylindrical member.

In an aspect of the present disclosure, the first semicylindrical member is larger than the second semicylindrical member.

In an aspect of the present disclosure, a central axis is defined through the first semicylindrical member. The first axle and the second axle each extend along the central axis.

In an aspect of the present disclosure, a hinge connects the first semicylindrical member with the second semicylindrical member. The hinge may be a piano hinge or a concealed hinge.

In an aspect of the present disclosure, a sidewall is defined about the cylindrical member and insulation is arranged within the sidewall.

In an aspect of the present disclosure, at least one handle arranged about the cradle.

In an aspect of the present disclosure, the cradle includes an inner sidewall and at least on indent formed in the inner sidewall of the cradle. The indent is configured for lifting the cradle out of the first semicylindrical member.

In an aspect of the present disclosure, at least one latch is coupled with the first semicylindrical member or the second semicylindrical member. The latch is configured to secure the first semicylindrical member to the second semicylindrical member when in a closed configuration.

In an aspect of the present disclosure, a second space is defined in the second semicylindrical member.

In an aspect of the present disclosure, a second handle is removably coupled with the handle.

In an aspect of the present disclosure, at least one cushioned member is connected with the handle or the second handle.

In an aspect of the present disclosure, an indent is formed in the first semicylindrical member and a protrusion is formed in the second semicylindrical member. The indent receives the protrusion therein to form a seal between the first semicylindrical member and the second semicylindrical member when in a closed configuration.

In an aspect of the present disclosure, a sealing member extends along the first semicylindrical member or the second semicylindrical member. The sealing member may be a rubber gasket configured to form a seal between the first semicylindrical member and the second semicylindrical member when in a closed configuration.

BRIEF DESCRIPTION OF THE DRAWINGS

Various aspects and features of the present disclosure are described hereinbelow with reference to the drawings wherein.

DETAILED DESCRIPTION

Figure 1:
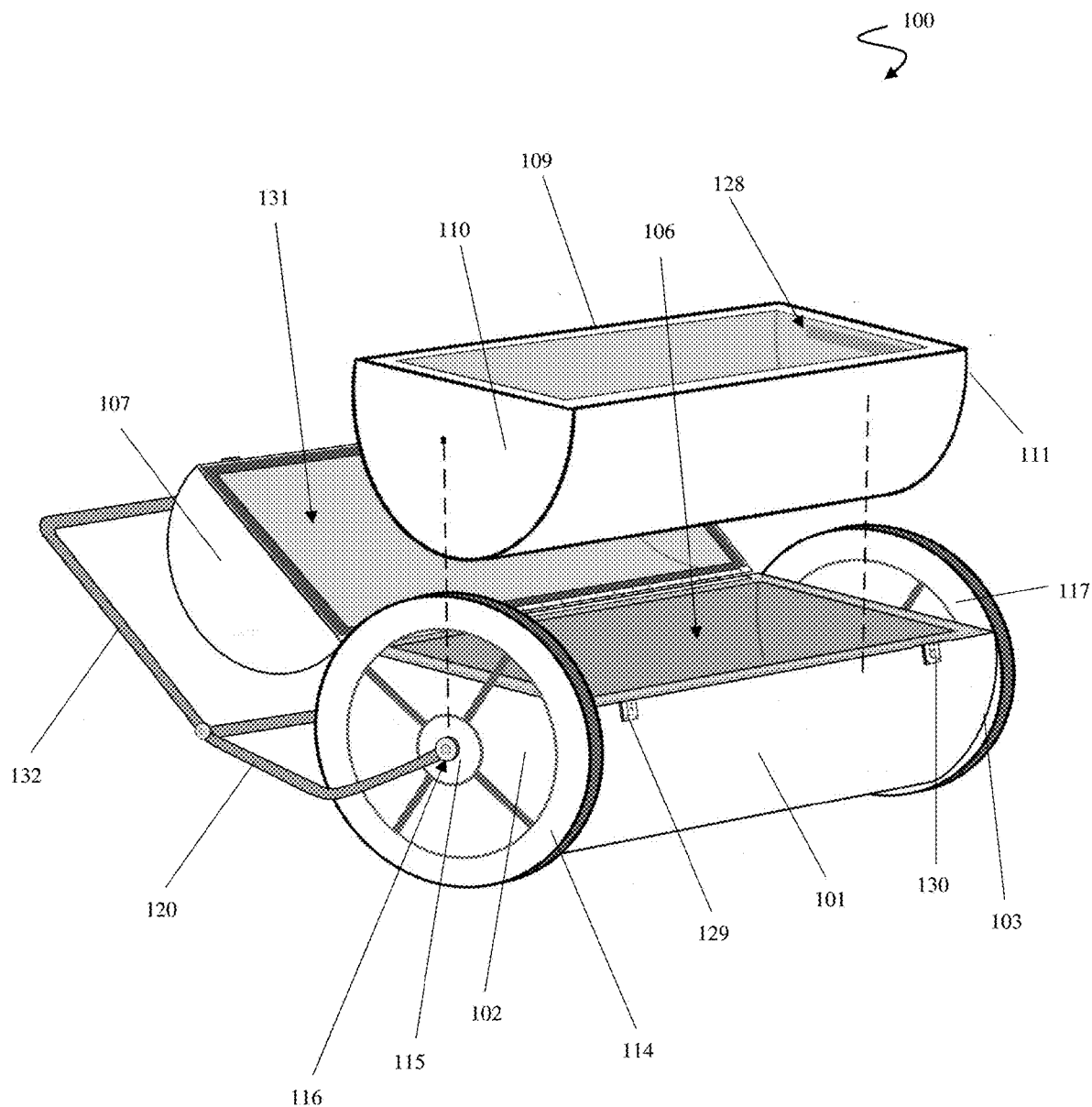
FIG. 1 is a front, perspective view of a portable cooler in an open configuration according to aspects of the present disclosure.
Figure 2:
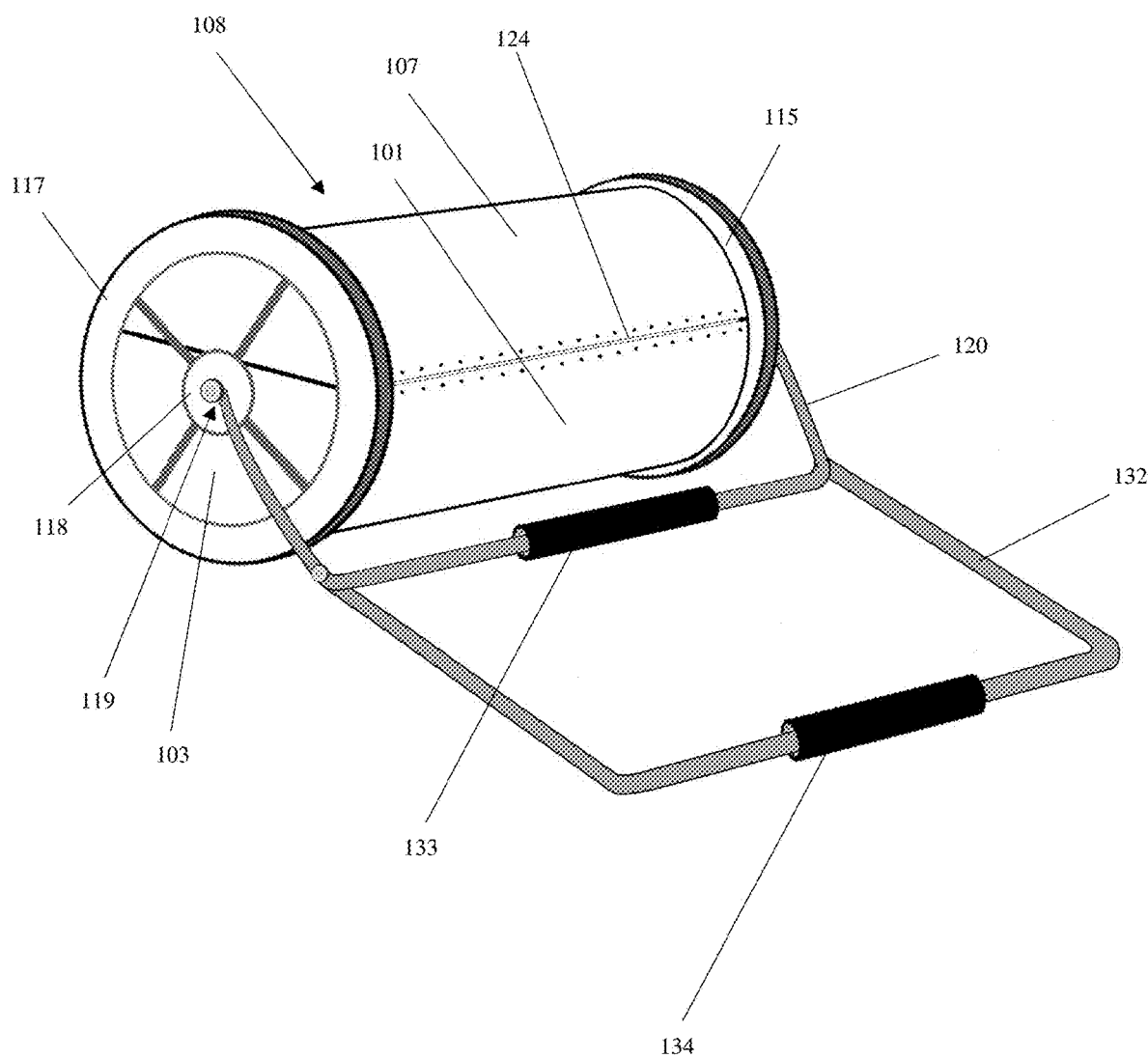
FIG. 2 is a rear, perspective view of the portable cooler of FIG. 1 in a closed configuration.
Figure 3:
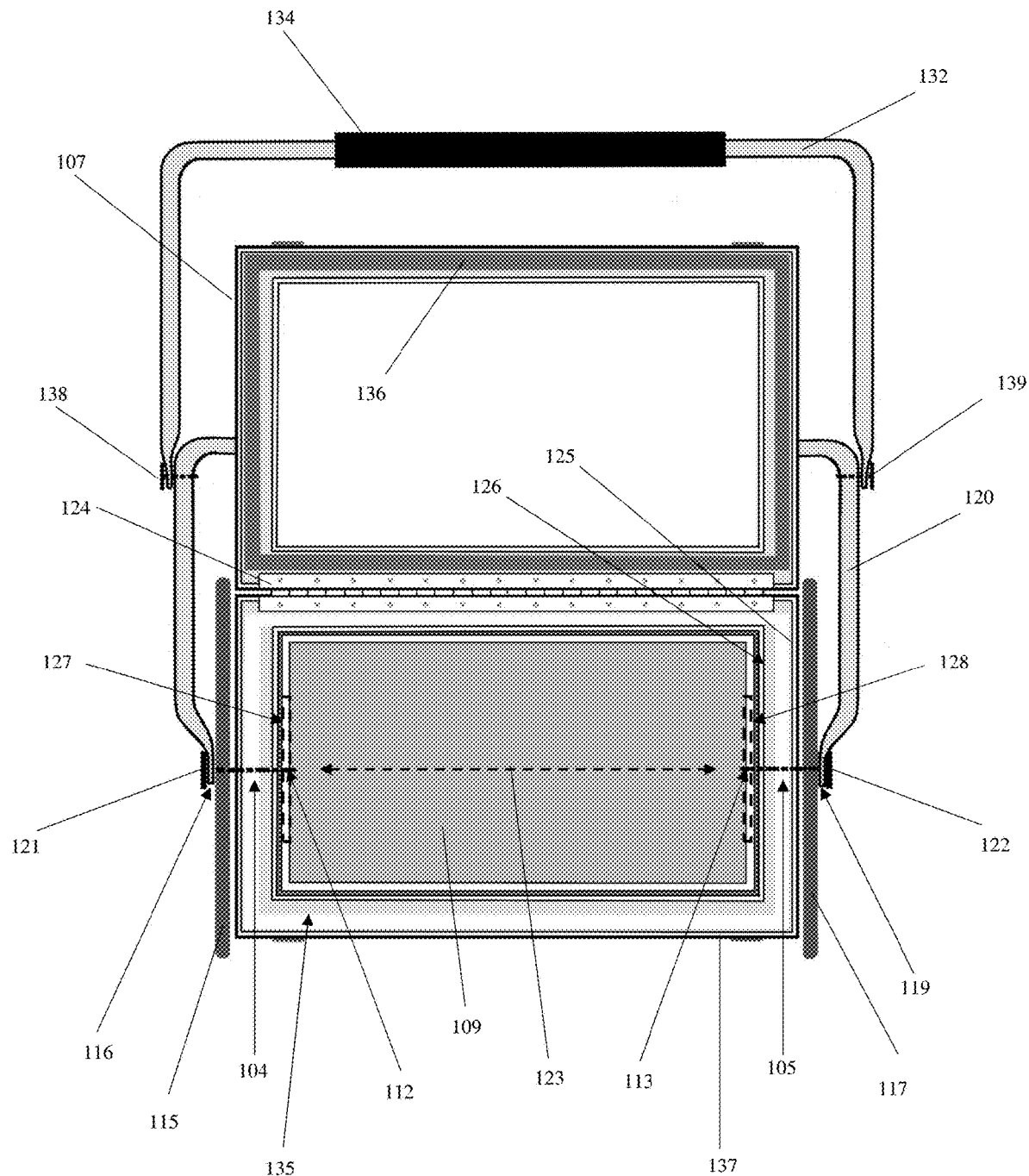
FIG. 3 is a top plan view of the portable cooler of FIG. 1 in an open configuration.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

Moving beach chairs, a beach umbrella, a beach cooler, drinks, food, ice, blankets, and other beach accessories can be very challenging especially transitioning from hard surfaces onto soft sand. One feature of the present inventive concept is to be able to easily pull a beach wagon cooler right onto the sand from a hard surface, such as a street or boardwalk.

Referring to FIGS. 1 to 4B, a portable cooler 100 includes a first semicylindrical member 101 defining a first side 102 and a second side 103. The first semicylindrical member 101 defines a first aperture 104 in the first side 102 and a second aperture 105 in the second side 103. The first semicylindrical member 101 defines a space 106. A second semicylindrical member 107 is hingedly coupled with the first semicylindrical member 101. The first semicylindrical member 101 and the second semicylindrical member 107 define a cylindrical member 108 when in a closed configuration. A cradle 109 is removably positioned in the first semicylindrical member 101. The cradle 109 defines a first side 110 and a second side 111. The cradle 109 defines a first orifice 112 in the first side 110 and a second orifice 113 in the second side 111 of the cradle 109. The cradle 109 can rotate with respect to the first semicylindrical member 101 within the space 106 defined by the first semicylindrical member 101. A first wheel 114 is rotatably coupled with the first semicylindrical member 101 at the first side 102 of the first semicylindrical member 101. The first wheel 114 includes a first hub 115 and a first aperture 116 defined in the first hub 115. A second wheel 117 is rotatably coupled with the first semicylindrical member 101 at the second side 103 of the first semicylindrical member 101. The second wheel 117 includes a second hub 118 and a second aperture 119 defined in the second hub 118. A handle 120 is coupled with the first wheel 114 and the second wheel 117.

A first axle 121 extends through the first aperture 116 of the first hub 115. The first axle 121 also extends through the first aperture 104 in the first side 102 of the first semicylindrical member 101 and into the first orifice 112 in the first side 110 of the cradle 109.

A second axle 122 extends through the second aperture 119 of the second hub 118. The second axle 122 also extends through the second aperture 105 in the second side 103 of the first semicylindrical member 101 and into the second orifice 113 in the second side 111 of the cradle 109.

In an aspect of the present disclosure, the cylindrical member 108 can rotate about the first axle 121 and the second axle 122 independently of the first wheel 114 and the second wheel 117. The cylindrical member 108 can also rotate independently of the cradle 109. The first wheel 114 can rotate about the first axle 121 independently of the handle 120, and the second wheel 117 can rotate about the second axle 122 independently of the handle 120.

Figure 4A:
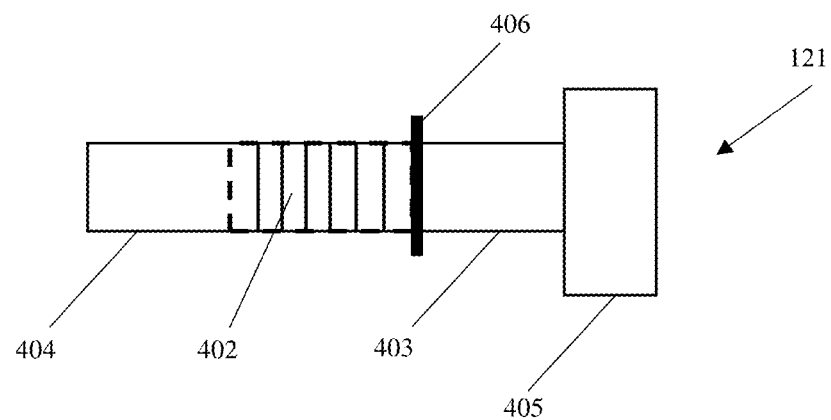
FIG. 4A is a cross-sectional view of an axle of the portable cooler of FIG. 1.
Figure 4B:
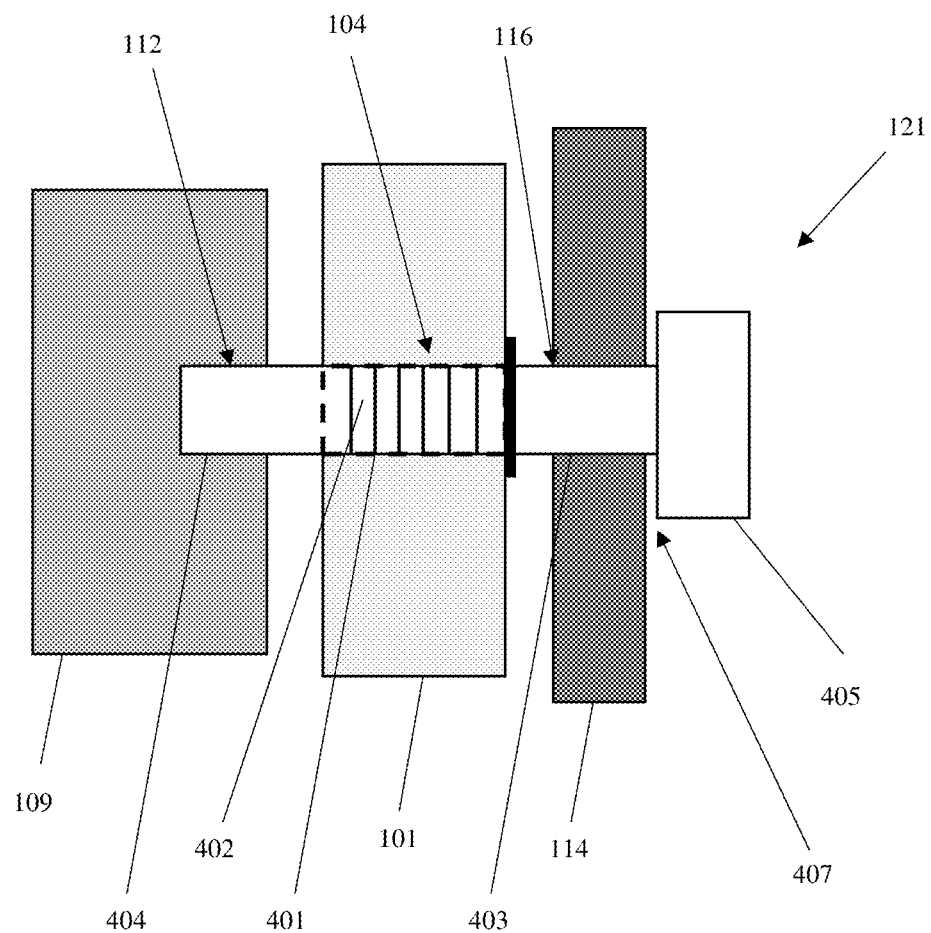
FIG. 4B is a cross-sectional view of the axle of FIG. 4A arranged in the portable cooler of FIG. 1.

Referring particularly to FIGS. 4A and 4B, a threaded bore 401 is formed in each of the first aperture 104 in the first side 102 of the first semicylindrical member 102 and the second aperture 105 in the second side 103 of the first semicylindrical member 101. A threaded member 402 is defined along each of the first axle 121 and the second axle 122. A first unthreaded member 403 is defined along each of the first axle 121 and the second axle 122. A second unthreaded member 404 is defined along each of the first axle 121 and the second axle 122. The threaded member 402 of the first axle 121 or the second axle 122 is threaded into the threaded bore 401 to connect the first axle 121 or the second axle 122 with the first semicylindrical member 121. Thus, the first axle 121 or the second axle 122 rotate along with the first semicylindrical member 121. The first unthreaded member 403 is position in the first aperture 116 of the first hub 115 or the second aperture 119 of the second hub 118. The first unthreaded member 403 allows rotation of the first wheel 114 or the second wheel 117 with respect to the first semicylindrical member 101. The second unthreaded member 404 is positioned in the first orifice 112 or the second orifice 113 of the cradle 109. The second unthreaded member 403 allows rotation of the cradle 109 with respect to the first semicylindrical member 101.

In an aspect of the present disclosure, each axle (e.g., axle 121) includes a head 405 and a stop member 406. The handle 120 may be disposed in space 407 and may rotatably contact the head 405. The stop member 406 can be employed to arrest longitudinal advancement of the first axle 122 resulting from rotation of the threaded member 402 along threaded bore 401.

While the first axle 121 is illustrated in FIGS. 4A and 4B, the second axle 122 described herein is substantially the same as the first axle 121.

In use, when a user unlatches latches 129, 130, the first semicylindrical member 101 can open and pivot on hinge 124. When the first semicylindrical member 101 is open it rests on handle 120.

Inside of the portable cooler 100 is the separate cradle 109 that rocks freely and stays relatively level to the ground by rocking on the axles 121, 122. Each of axles 121, 122 can be removed (e.g., to disassembly the portable cooler 100 for storage or transport). The axles 121, 122 may extend along the central axis 123 upon which the entire portable cooler 100 can rotate on when it is closed and latched. When the closed portable cooler 100 is being pulled and spinning freely it is controlled by handles 120 and 132.

Cradle 109 will have most of its weight below central axis 123. Cradle 109 gets lighter as it approaches the central axis 123 starting from the bottom of the cradle 109 and going higher. Having most of the cradle 109 weight under the central axis 123 enables the cradle 109 to rock level to the ground by rocking on axles 121, 122 within the portable cooler 100 when it is closed, spinning freely, and being pulled by handles 120, 132. Cradle 109 remains level to the ground with any contents placed into it as it rocks freely on axles 121, 122.

Cradle 109 can hold both perishable and non-perishable contents and can hold and insulate ice. Ice within cradle 109 is insulated from melting when the first semicylindrical member 101 is closed and is held in place by latches 129, 130. The first and second semicylindrical members 101, 107 may each be double walled and filled with insulating foam filling within sidewalls thereof. When the first and second semicylindrical members 101, 107 are closed and latched together it also creates an insulating barrier from outside temperatures for cradle 109.

There is an insulating seal barrier formed when the first and second semicylindrical members 101, 107 are closed and latched together. The seal creates a barrier from dust, sand, or debris from entering the portable cooler 100 as it spins freely across the ground, sand, or various terrain. The insulating barrier also helps in insulating the interior of the portable cooler 100 from outside temperatures.

The axles 121, 122 can screw in and out of the first semicylindrical member 101. This allows for a quick release of the handle 120 and of the cradle 109 from the portable cooler 100. Removing cradle 109 from portable cooler 100 allows for easier cleaning and overall maintenance of the portable cooler 100.

The entire outer shell (e.g., including the first and second semicylindrical members 101, 107) of the portable cooler 100 spins freely when pulled by handle 120 and/or handle 132 on axles 121, 122. The portable cooler 100 can be pulled easily onto sand as most of the portable cooler 100 weight will transfer onto the outer shell and will be distributed uniformly across when making contact with sand. When the portable cooler 100 is pulled from the sand onto any hard surface, the entire weight of the portable cooler 100 is distributed onto the wheels 115, 117. The wheels 115, 117 makes it very easy to move the portable cooler 100 along any hard surface. The wheels 115, 117 are each held in place along central axis 123 by the axles 121, 122.

Handles 120, 132 may be joined to each other by screw knobs 138, 139 allowing for quick release of the handles 120, 132 from each other. When screw knobs 138, 139 are loosened, handle 132 can fold into handle 120 for space savings during the transportation of portable cooler 100. When the screw knobs 138, 139 are completely removed then handle 132 can be removed from handle 120 allowing the user to grab the cushioned member 133 on handle 120 when lifting portable cooler 100. Handles 120, 132 can also be joined together to make a bigger handle together by tightly screwing the screw knobs 138, 139 through their respective threaded openings. The bigger combined handle makes it easier to roll the entire portable cooler 100. A bigger combined handle also creates a platform to strap beach chairs, beach umbrellas, or any other accessories onto the portable cooler 100 while freely moving the portable cooler 100 around.

In an aspect of the present disclosure, the first axle and the second axle are removably coupled with the first semicylindrical member.

In an aspect of the present disclosure, the first semicylindrical member is larger than the second semicylindrical member.

In an aspect of the present disclosure, a central axis 123 is defined through the first semicylindrical member 101. The first axle 121 and the second axle 122 each extend along the central axis 123.

In an aspect of the present disclosure, a hinge 124 connects the first semicylindrical member 101 with the second semicylindrical member 107. The hinge may be a piano hinge or a concealed hinge.

In an aspect of the present disclosure, a sidewall 125 is defined about the cylindrical member 108 and insulation 126 is arranged within the sidewall 125.

In an aspect of the present disclosure, at least one handle is arranged about the cradle 109. For example, first and second indents 127 and 128 may be formed in the inner sidewall 125. The indents 127 and 128 are configured for lifting the cradle 109 out of the first semicylindrical member 101.

In an aspect of the present disclosure, at least one latch (e.g., latch 129 or latch 130) is coupled with the first semicylindrical member 101 or the second semicylindrical member 107. The latch is configured to secure the first semicylindrical member 101 to the second semicylindrical member 107 when in a closed configuration.

In an aspect of the present disclosure, a second space 131 is defined in the second semicylindrical member 107. The space 131 allows for additional room within cylindrical member 108 for any objects held in the cradle 109 to project into second space 131.

In an aspect of the present disclosure, a second handle 132 is removably coupled with the handle 120. A first cushioned member 133 may be connected with the handle 120 and/or a second cushioned member 134 may be connected with the second handle 132. The cushioned members 133, 134 can be employed to assist in lifting up or pulling the portable cooler 100. As an example, the second handle 132 may be detached from the handle 120, and the handle 120 along may be employed for lifting up the portable cooler 100.

In an aspect of the present disclosure, an indent 135 is formed in the first semicylindrical member 101 and a protrusion 136 is formed in the second semicylindrical member 107. The indent 135 receives the protrusion 136 therein to form a seal between the first semicylindrical member 101 and the second semicylindrical member 107 when in a closed configuration. The positions of the indent 135 and the protrusion 136 may be reversed with respect to the first and second semicylindrical members 101, 107.

In an aspect of the present disclosure, a sealing member 137 extends along the first semicylindrical member 101 or the second semicylindrical member 107. The sealing member 137 may be a rubber gasket configured to form a seal between the first semicylindrical member 101 and the second semicylindrical member 107 when in a closed configuration.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A portable cooler, comprising:
   a first semicylindrical member defining a first side and a second side, the first semicylindrical member defining a first aperture in the first side and a second aperture in the second side of the first semicylindrical member, the first semicylindrical member defining a space therein;
   a second semicylindrical member hingedly coupled with the first semicylindrical member, the first semicylindrical member and the second semicylindrical member defining a cylindrical member;
   a cradle removably positioned in the first semicylindrical member, the cradle defining a first side and a second side, the cradle defining a first orifice in the first side and a second orifice in the second side of the cradle, wherein the cradle is configured to rotate with respect to the first semicylindrical member within the space defined by the first semicylindrical member;

a first wheel rotatably coupled with the first semicylindrical member at the first side of the first semicylindrical member, the first wheel including a first hub and a first aperture defined in the first hub;

a second wheel rotatably coupled with the first semicylindrical member at the second side of the first semicylindrical member, the second wheel including a second hub and a second aperture defined in the second hub;

a handle coupled with the first wheel and the second wheel;

a first axle extending through the first aperture of the first hub, through the first aperture in the first side of the first semicylindrical member and into the first orifice in the first side of the cradle; and a second axle extending through the second aperture of the second hub, through the second aperture in the second side of the first semicylindrical member and into the second orifice in the second side of the cradle.

2. The portable cooler of claim 1, wherein the cylindrical member is configured to rotate about the first axle and the second axle independently of the first wheel and the second wheel, and independently of the cradle.

3. The portable cooler of claim 2, further including:

a threaded bore formed in each of the first aperture in the first side of the first semicylindrical member and the second aperture in the second side of the first semicylindrical member;

a threaded member defined along each of the first axle and the second axle;

a first unthreaded member defined along each of the first axle and the second axle; and a second unthreaded member defined along each of the first axle and the second axle, wherein the threaded member of the first axle or the second axle is threaded into the threaded bore to connect the first axle or the second axle with the first semicylindrical member, wherein the first unthreaded member is position in the first aperture of the first hub or the second aperture of the second hub, the first unthreaded member configured to allow rotation of the first wheel or the second wheel with respect to the first semicylindrical member, and wherein the second unthreaded member is positioned in the first orifice or the second orifice of the cradle, the second unthreaded member configured to allow rotation of the cradle with respect to the first semicylindrical member.

4. The portable cooler of claim 3, wherein the first axle and the second axle are removably coupled with the first semicylindrical member.

5. The portable cooler of claim 1, wherein the first wheel is configured to rotate about the first axle independently of the handle, and the second wheel is configured to rotate about the second axle independently of the handle.

6. The portable cooler of claim 1, wherein the first semicylindrical member is larger than the second semicylindrical member.

7. The portable cooler of claim 6, further including a central axis defined through the first semicylindrical member, wherein the first axle and the second axle each extend along the central axis.

8. The portable cooler of claim 1, further including a hinge connecting the first semicylindrical member with the second semicylindrical member.

9. The portable cooler of claim 8, wherein the hinge is a piano hinge or a concealed hinge.

10. The portable cooler of claim 1, further including a sidewall defined about the cylindrical member and insulation arranged within the sidewall.

11. The portable cooler or claim 1, further including at least one handle arranged about the cradle.

12. The portable cooler of claim 1, further including an inner sidewall defined in the cradle, and at least one indent formed in the inner sidewall of the cradle, the at least one indent configured for lifting the cradle out of the first semicylindrical member.

13. The portable cooler of claim 1, further including at least one latch coupled with the first semicylindrical member or the second semicylindrical member, the at least one latch configured to secure the first semicylindrical member to the second semicylindrical member.

14. The portable cooler of claim 1, further including a second space defined in the second semicylindrical member.

15. The portable cooler of claim 1, further including a second handle removably coupled with the handle.

16. The portable cooler of claim 1, further including at least one cushioned member connected with the handle or the second handle.

17. The portable cooler of claim 1, further including an indent formed in the first semicylindrical member and a protrusion formed in the second semicylindrical member, the indent configured to receive the protrusion therein to form a seal between the first semicylindrical member and the second semicylindrical member.

18. The portable cooler of claim 17, further including a sealing member extending along the first semicylindrical member or the second semicylindrical member.

* * * * *